United States Patent [19]
Epps

[11] Patent Number: 5,034,947
[45] Date of Patent: Jul. 23, 1991

[54] WHISPER CIRCUIT FOR A CONFERENCE CALL BRIDGE INCLUDING TALKER NULLING AND METHOD THEREFOR

[75] Inventor: David C. Epps, Denver, Colo.

[73] Assignee: ConferTech International, Golden, Colo.

[21] Appl. No.: 490,095

[22] Filed: Mar. 6, 1990

[51] Int. Cl.$^5$ .................... H04M 3/42; H04Q 11/04
[52] U.S. Cl. ........................................ 370/62; 370/68; 370/77; 379/202
[58] Field of Search .................... 370/62, 68, 61, 68.1, 370/66, 77, 79, 110.1, 58.1, 58.2, 58.3; 379/202, 206, 207

[56] References Cited

U.S. PATENT DOCUMENTS

| | | | |
|---|---|---|---|
| 3,743,790 | 7/1973 | Hilsley | 370/62 |
| 3,835,259 | 9/1974 | Medill et al. | 370/62 |
| 4,109,111 | 8/1978 | Cook | 370/62 |
| 4,416,007 | 11/1983 | Huizinga et al. | 370/62 |
| 4,485,469 | 11/1984 | Witmore | 370/68 |
| 4,797,876 | 1/1989 | Ratcliff | 370/62 |

FOREIGN PATENT DOCUMENTS 2146506   4/1985   United Kingdom .................. 370/62

*Primary Examiner*—Douglas W. Olms
*Assistant Examiner*—Alpus H. Hsu
*Attorney, Agent, or Firm*—Dorr, Carson, Sloan & Peterson

[57] ABSTRACT

A circuit enabling whisper conferencing between two whisper conferees in a conference call. The conference call may contain any number of parties including the two whisper conferees and is interconnected to a digitized conference bridge over PCM telephone carrier lines. The present invention includes a cross-point switch connected to the PCM telephone carrier lines for interchanging the PCM speech data occurring in the time slots for the two whisper conferees so that the PCM speech data for the first of the two whisper conferees is placed in the time slot for the second of the two whisper conferees and vice versa. A summation circuit is utilized to sum the telephone conversations of all remaining conferees and the two interchanged telephone conversations of the whisper conferees are then selectively added to the summed signals. Talker nulling is also incorporated into a combined talker nulling/whisper conferencing circuit so as to provide nulling to all talkers (other than whisper conferees) to the telephone conversation.

14 Claims, 8 Drawing Sheets

Fig. 7

| TALKER | TSG | SUBTRACT | LISTENER |
|--------|-----|-----------|----------|
| A | 1 | B + C + D | A |
| B | 1 | A + C + D | B |
| C | 1 | A + B + D | C |
| D | 1 | A + B + C | D |

| TALKER | TSG | SUBTRACT | LISTENER |
|--------|-----|-----------|----------|
| A | 1 | B + D | A |
| B | 1 | A + D | B |
| - | 0 | A + B + D | C |
| D | 1 | A + B | D |

$\Delta T$ TS0 A — 54 →

60: $\mu$-LAW or A-LAW PCM SUBTRACTER → 30

TSG$_A$

| PARTY | ACTIVITY | SUMMATION OUTPUT 20 | TALKER NULLING 1032 | WHISPER 1032 | CONVERSATION HEARD 30 |
|---|---|---|---|---|---|
| A | TALKING | A + F | A | | F |
| B | WHISPER | A + F | | E | (A + F) + E |
| C | QUIET | A + F | | | A + F |
| D | QUIET | A + F | | | A + F |
| E | WHISPER | A + F | | B | (A + F) + B |
| F | TALKING | A + F | F | | A |

| PARTY | ACTIVITY | SUMMATION OUTPUT 20 | WHISPER ADD | CONVERSATION HEARD 30 |
|---|---|---|---|---|
| A | TALKING | A + F | | |
| B | WHISPER | A + F | E | (A + F) + E |
| C | QUIET | A + F | | |
| D | QUIET | A + F | | |
| E | WHISPER | A + F | B | (A + F) + B |
| F | TALKING | A + F | | |

Fig. 14

WHISPER CIRCUIT FOR A CONFERENCE CALL BRIDGE INCLUDING TALKER NULLING AND METHOD THEREFOR

BACKGROUND OF THE ART

1. Related Invention

This invention is related to Ser. No. 07/490,092, Filed Mar. 6, 1990, and entitled "Circuit for Nulling the Talker's Speech in a Conference Call and Method Thereof" by the same inventor.

2. Field of the Invention

The present invention relates to digital domain conference calls on a bridge in a telephone network and, in particular, first to a circuit for permitting two parties to conduct a whisper conference in the conference call while attending the conference call without the other parties in the conference call hearing the whisper conference and second to a whisper circuit combined with a talker nulling circuit.

3. Statement of the Problem

A problem exists in present conference calls for a conference bridge in a telephone network wherein two parties to the conference call desire to conduct a whisper conference (i.e., their conference is private and not broadcast to the other parties on the conference call). A need, therefore, exists for a circuit for use on a digital domain conferencing bridge in a telephone system that permits at least two parties on the conference call to conduct a whisper conference wherein they still continue to hear the conversation on the conference call but wherein the other parties to the conference call cannot hear the whisper conference.

A problem also exists in present conference calls on the telephone network wherein an echo is heard by a talker when a large number of talkers are summed together as discussed in the above-identified related invention. A number of approaches are available for minimizing the echo that a talker hears when talking such as half duplexing circuitry, voice activated switching, and the like. Despite the existence of several solutions to the problem, a need exists for a circuit for use in the digital domain that not only shares circuitry with the whisper circuit but that also eliminates one hundred percent of the talker's speech component during transmission back to the ears of a talker in a conference call.

4. Solution to the Problem

The present invention provides a solution to both of the problems set forth above.

A whisper circuit is provided for a digital domain conferencing bridge in a telephone system that permits two parties in the conference call to conduct a whisper conference between each other without being heard by the other parties on the conference call. At the same time, the two parties to the whisper conference can still hear the entire conversation being carried on by all of the other parties to the conference call. The remaining parties on the conference call are not aware that the two parties are having a whisper conference.

Furthermore, the present invention provides a solution in that through a combinational circuit talker nulling and whisper conferencing are both provided. The talker nulling circuit is combined with the whisper circuit of the present invention to remove the digitized speech of the other individual talkers on the conference call (other than the two parties to the whisper conference).

SUMMARY OF THE INVENTION

The present invention provides a circuit enabling whisper conferencing between two whisper conferees in a conference call. The conference call may contain any number of parties including the two whisper conferees. All parties are interconnected to a digitized conference bridge over PCM telephone carrier lines.

The present invention includes a cross-point switch connected to the PCM telephone carrier lines for interchanging the PCM speech data occurring in the time slots for the two whisper conferees so that the PCM speech data for the first of the two whisper conferees is placed in the time slot for the second of the two whisper conferees and vice versa. A summation circuit is utilized to sum the telephone conversations of all remaining conferees and the two interchanged telephone conversations of the whisper conferees are then selectively added to the summed signals.

Under the teachings of the present invention, talker nulling may also be incorporated into a combined talker nulling/whisper conferencing circuit. In which case, talker nulling is provided to all talkers (other than whisper conferees) to the telephone conversation.

DESCRIPTION OF THE DRAWING

FIG. 7 sets forth a first example of four parties on a conference call with each party talking;

FIG. 8 sets forth a second example of five parties on a conference call with three parties talking;

FIG. 9 sets forth the block diagram details of the subtraction circuit of the present invention;

FIG. 14 is a table setting forth an example of a six party conference call with two parties engaged in a whisper conference.

DETAILED SPECIFICATION

Figure 1:
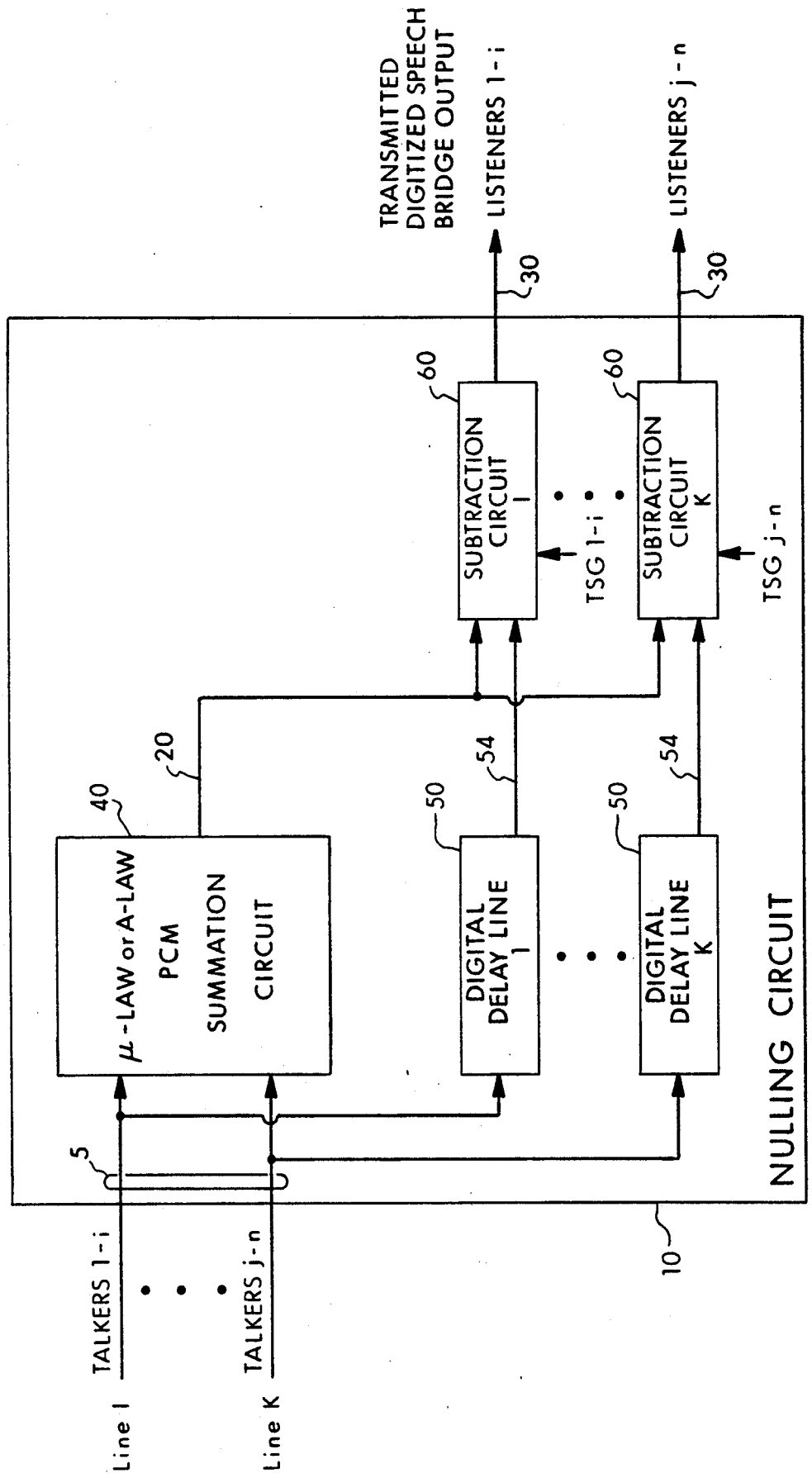
FIG. 1 is an overall block diagram of the present invention showing the summation circuit, the delay lines, and the subtraction circuits.
Figure 2:
FIG. 2 is a prior art representation of PCM companded data in CEPT format.
Figure 3:
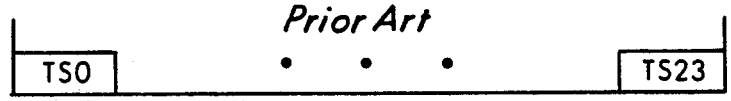
FIG. 3 is a prior art representation of PCM companded data in T1 format.

FIG. 1 sets forth the block diagram representation of the nulling circuit of the present invention 10. The nulling circuit 10 is connected to conventional lines 5 wherein each line contains a number of talkers (such as 1-i on line 1) for a total of n talkers on the conference call involving n parties. For example, in FIG. 2, the CEPT (Conference Europeanen des Administrations des Postes et des Telecommunications) standard for digitized speech transmission on the telephone network is set forth. The CEPT Standard utilizes 32 time slots at a frequency of 2.048 Mb per second. Two of the CEPT time slots are not used for speech data. Each CEPT speech data time slot contains eight bits of speech data. Likewise, in FIG. 3, the T1 carrier standard in the United States is set forth to show 24 time slots at a frequency of 1.544 Mb per second wherein each time slot comprises eight bits of speech data.

With reference back to FIG. 1, in the preferred invention, k=4 since four PCM telephone carrier lines 5 are utilized. Under the CEPT standard (also termed "PCM 30"), the total number of parties would be 120 and under the T1 standard, the total number of parties would be 96. It is to be expressly understood that the present invention is not limited with respect to the value of k (i.e., the number of lines) or to the number of parties (i.e., the value of n).

The output of the nulling circuit 10 of the present invention is the transmitted digitized speech bridge output 30 which comprises the bridge output for the conference call, and which is delivered to the individual parties who listen to the speech output.

Within the nulling circuit 10 exists a $\mu$-Law (or A-Law PCM) summation circuit 40, digital delay lines 50, and $\mu$-Law (or A-Law) PCM subtraction circuits 60.

The $\mu$-Law (or A-Law) summation circuit 40 simply sums the conversations of all the parties who are talking (i.e., the talkers) on lines 1-k for delivery as the bridge output to all of the conference call parties except to the listener who is also the talker. For example, if a talker is listening to the conversation, he hears all speech on line 20 except his own since his version of the conversation appearing on line 20 is delivered through a subtraction circuit 60 and over line 30 to him.

Hence, digital delay lines 50 are interconnected to lines 1-k. The output of each delay line 54 is delivered to a $\mu$-Law (or A-Law) PCM subtraction circuit 60. Each subtraction circuit 60 receives the digitized speech data appearing on line 20 as well as the individual talker's delayed speech data appearing on line 54 and outputs the transmitted digitized speech data less the talker's speech data on lines 30. Each subtraction circuit 60 is further controlled by a talk slot grant (TSG) signal which corresponds to each individual talker 1-n.

The talk grant signals (TSG$_\eta$) are conventionally generated in conference calls. In FIG. 1, the parties on line 5 are talkers as determined by the algorithms used in the bridge to generate the TSGs. For example, such algorithms may conventionally include VOX, gain compensation, and/or a nexus algorithm. For example, in a conference call of 20 parties, three parties could be talking. Each of these three talkers would have speech data appearing on lines 5 and each would have their respective TSGs activated. However, all 20 parties are listeners on lines 30 and would hear the conversation. The three talkers would have their individual speech subtracted since their corresponding TSGs are activated. The remaining parties would simply have the sum of all speech on line 20 delivered through the subtraction circuits 60 unaffected.

It can be readily appreciated upon reviewing FIG. 1 that for any talker 1-n, that his individual speech data will be delayed by a digital delay line 50 sufficiently long enough so that as the summation circuit 40 delivers the summation of all speech data in the conference call on output 20. The subtraction circuit 60 functions to fully subtract (100% subtract) out the individual talker's speech data when the speech is delivered back into the ears of the talker as a listener. Only the talker's individual speech data is subtracted out since all other talkers must hear the other conversations successfully. By subtracting out the individual talker's speech as it is returned to the talker's ear as a listener, echo is fully eliminated as well as fully eliminating distortion thereby creating a high quality sound for the conference call conversation to the individual talker.

It is to be expressly understood that a delay line 50 and a subtraction circuit 60 is provided for each line 5 and that in the present invention K delay lines 50 and subtraction circuits 60 are provided for n talkers of each of these circuits are provided.

1. Summation Circuit 40

Figure 4:
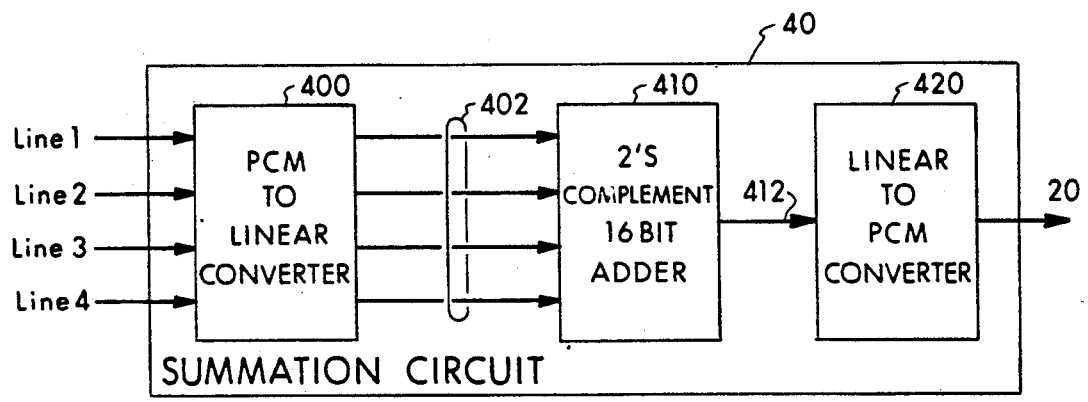
FIG. 4 sets forth in block diagram the format for the contents of the summation circuit of the present invention.

In FIG. 4 the details of the summation circuit 40 are shown. The summation circuit 40 includes a PCM to linear converter 400, a 16 bit (2's compliment) adder 410 and a linear to PCM converter 420. The PCM to linear converter 400 comprises a conventional 65536 byte EPROM look-up table. As mentioned, in the preferred embodiment, four telephone carrier lines input the summation circuit 40. The preferred embodiment, however, is not limited to four lines. The digitized speech data on lines 1-4 is in either $\mu$-Law or A-Law PCM format as is the sum of all speech data on line 20.

The PCM to linear converter 400 delivers its output over lines 402 to the 16 bit 2's compliment adder 410 whose single output 412 is delivered to the linear to PCM converter 420 for outputting the sum of all speech data on line 20.

In the preferred embodiment, the PCM to linear converter is a 65536 byte EPROM based look-up table. The 16 bit adder 410 is a conventional multistage adder implemented in two 4-bit adders with carry/borrow stored for adding the high order 8 bits in the successive stage. For example, the adder can be of the type as the conventionally available 74 HCT-283. The linear to PCM converter 420 is also a standard 65536 byte EPROM based look-up table.

Figure 5:
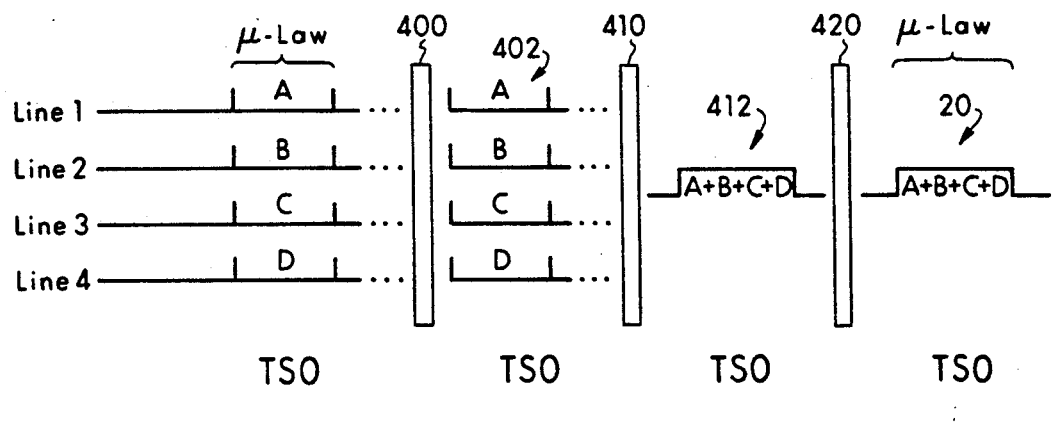
FIG. 5 sets forth the timing of the PCM and linear data as it flows through the summation circuit.

The summation circuit 40 operates according to the illustration in FIG. 5. In FIG. 5, the four lines 1-4 are shown having talk slot TS0 dedicated to four separate talkers/listeners; for example, parties A, B, C, and D. As mentioned, each time slot is eight bits wide and the data corresponding to the speech (if the person is talking) is coded according to conventional $\mu$-law or A-law companded PCM encoded data. The PCM to linear converter converts the PCM encoded data into a linear code which in the preferred embodiment is 2's compliment form and sixteen bits wide. The 2s compliment form is used to express the positive and negative excursions of the represented analog wave form of the speech. The linear code for the speech data digitally corresponds to the actual analog value of the speech of individuals A, B, C, or D. If a party is not talking the value would be zero. The PCM to linear converter 400 is simply a standard look-up table wherein the eight bit companded PCM data is used as an address to look up the corresponding 16 bit 2's compliment form linear code. The data in linear code is a true digital representation of the speech from the individual speaker.

The sixteen bit adder 410 is a fixed state machine which adds the four linear encoded speech data values for individuals A, B, C, and D in time slot TS0. The resulting linear output from adder 410 is delivered on line 412 and is a sixteen bit data word in twos compliment form. The linear to PCM converter 420 converts the format of the 16 bit linear sum of all speech data back into PCM format—again through a table look-up. The μ-law encoding format is used for the T1 carriers whereas the A-law encoding format is used for CEPT carriers.

At this point in the operation of the present invention, it is clear that the summation circuit 40 is capable of adding together all talker speech data existing in each time slot by first converting the PCM speech data to linear speech data on lines 402, then adding the individual talker signals in each time slot together in the sixteen bit adder 410 which outputs a single summation signal on line 412 for each time slot for the form lines for conversion from linear format back to PCM format on line 20. The output on line 20 is the summation of all sound (from talkers background noise, transmission noise, etc.) and exists as eight bit PCM speech data.

It is to be understood that the data field widths are by way of example and that the present invention is not to be limited to such data fields.

2. Operation of Delay and Subtraction Circuits 50 and 60

Figure 6:
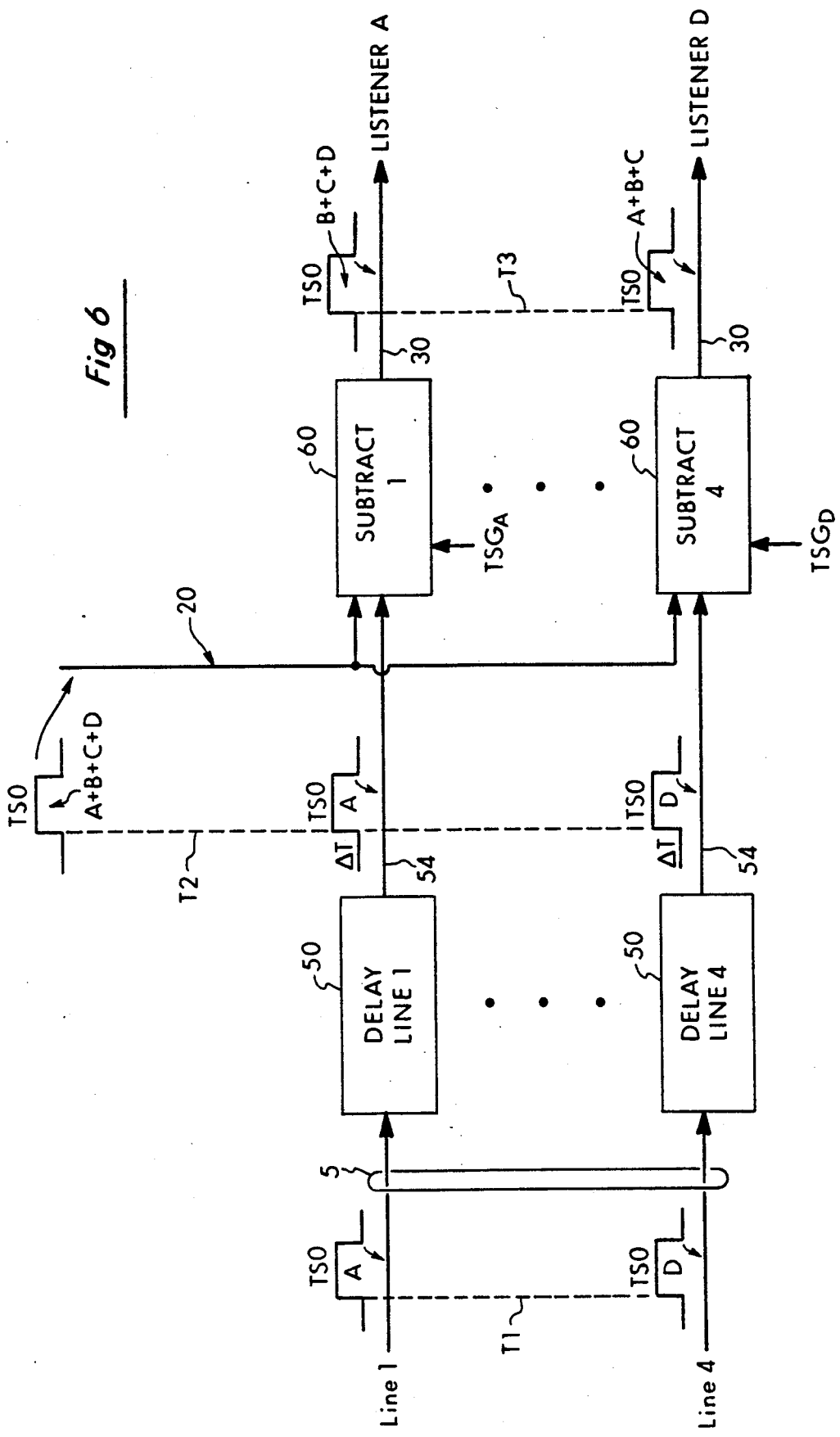
FIG. 6 sets forth the timing between the delay line and subtraction circuit of the present invention.

In FIG. 6, the details of the delay line circuits 50 and the subtraction circuits 60 are shown. As discussed with respect to FIGS. 4 and 5, the output 20 from the summation circuit 40 is the summation of all speech data for lines 20 in a common time slot which, in FIGS. 4 and 5, is shown to be talk slot TS0. This is the signal (A+B+C+D for TS0) appearing on line 20 of FIG. 6 for delivery to the parties of the conference call. This signal, of necessity, due to the inherent processing delays in the summation circuit 40, is delayed from the original PCM signals on lines 5 (lines 1-4 carrying A, B, C, D for TS0) which are also shown in FIG. 6 as the inputs to the delay line circuits 50.

Hence, as shown in FIG. 6, delta T represents the time difference between the time T2 for the summed signal on line 20 for time slot TS0 (A+B+C+D) and the time T1 for the imputing of TS0 signals A, B, C, and D appearing on lines 1-4. The delay line circuit 50 is designed to delay the speech data on lines 1-4 by the amount of delta T. In the above example, this time delay is 125 microseconds. The value of delta T would include any switch delays incurred as a result of signal routing and connection within the system. It is to be understood that the delta T time is by way of an example and the present invention is not limited to this delay. A number of conventional delay circuits could be utilized and in the present invention the speech data is delivered through a tapped delay line with taps at integer 125 microsecond intervals.

As shown in FIG. 6 by timing line T2, the delayed A, B, C and D TS0 speech data on lines 5 is aligned with the A+B+C+D TS0 summation speech data on lines 20. Delta T is simply the difference between time T1 and time T2. The delay circuit 50, therefore, precisely matches the timing of the speech data for each individual talker A through D with the summed A+B+C+D speech data.

Each subtract circuit 60 receives the TS0 speech data for A+B+C+D over line 20 as well as each delayed individual talker speech data A, B, C, and D over lines 54. Each individual subtract circuit 60 is enabled to perform subtraction through selective activation of the talk slot grant signal (TSG).

For example, assume all four talkers A, B, C, and D, are talking. The TSG for each subtract circuit 60 would be properly activated to authorize subtraction. In reference to FIG. 7, assume all four parties to a conference call (A, B, C, and D) are talkers and have their TSG activated (i.e., a "1" status) so that they are all talking on a conference call. The subtract circuit 60 operates to subtract each talker's speech data from the sum A+B+C+D so that the talker, as a listener, hears the other partys' speech but not his own. This occurs at time T3 (shown in FIG. 6) which is later than time T2 because of the necessary delays incurred by the subtract circuit 60. For this example, these reference times are:

T1=0
T2=125 MSEC
T3=250 MSEC

FIG. 7 shows the resulting speech being delivered to each listener A, B, C, and D for TS0. Hence, listener A hears B+C+D.

FIG. 8 illustrates a second example involving a conference call with four parties: A, B, C, and D. All parties, of course, are listeners. However, in this example, only parties A, B, and D are talkers. Hence, TSGs for A, B, and D are activated for subtraction whereas C is not activated. Talker A (who also listens to the conversation) receives conversation from B and D. Talker C receives conversation from A, B, and D (of course C is not talking and the actual conversation is from A+B+D). The selective activation of TSG enables the subtraction in circuit 60 to occur.

Exemplary data values for the example of FIG. 8 appears in the following two tables with talkers A, B and D and are the hexadecimal input speech values of 66, 35 and D6 respectively:

TABLE I

SUMMATION CIRCUIT 40
(Data Values are in Hexadecimal)
TS0

| Talker | μ-Law pCM Input Speech Data 5 | Linear Code Lines 402 | Linear Code Line 412 | μ-Law PCM Line 20 |
|---|---|---|---|---|
| A | 66 | 0B1F | 624 | 59 |
| B | AA | FF40 | 624 | 59 |
| C | 35 | 0137 | 624 | 59 |
| D | D6 | FA81 | 624 | 59 |

TABLE II

SUBTRACTION CIRCUIT 60
TS0

| Talker | U-Law PCM Input Speech Data 5 | Line 54 | Line 20 | μ-Law PCM Lines 30 |
|---|---|---|---|---|
| A | 66 | 66 | 59 | 05 |
| B | AA | AA | 59 | 59* |
| C | 35 | 35 | 59 | 54 |
| D | D6 | D6 | 59 | 67 |

*(DAVE, IN YOUR CHART YOU HAD 56 - WHICH IS CORRECT?)
(ARE THESE TABLES IN SUPPORT OF FIG. 7 OR FIG. 8 - TWO SEPARATE EXAMPLES?)

3. Details of Subtraction Circuit 60

In FIG. 9, the details of the subtraction circuit 60 are set forth. The subtraction circuit 60 is connected to receive the summed speech data for TS0 (A+B+C+D) on line 20. This PCM data is the sum of all speech appearing for the conference call during a respective time slot. The subtraction circuit 60 also receives the delayed individual talker speech data which in the example of FIG. 7 is talker A at time slot TS0. As in the case of FIG. 9, the PCM subtractor is a 131072 byte table look-up device (such as an EPROM) that allows the appropriate incoming companded PCM data to be converted into a thirteen bit linear code which truly represents the analog value of the speech component. The linearized PCM at 54 is subtracted from the linearized PCM of 20 and the result is converted back into an 8 bit PCM companded signal for delivery to the listener.

It is to be expressly understood that the present invention is not limited to talkers A, B, C, or D as shown in FIG. 7 or even the example shown in FIG. 8. These examples are illustrations. In conference calls, any number of parties can be interconnected and the present invention allows that number to be larger up to, for example, 128 parties. The present invention effectively provides talker nulling to each individual talker thereby eliminating echo and distortion. This is a one hundred percent elimination of echo.

4. Method

The method of the present invention is adapted for nulling each talker's speech in a conference call wherein the conference call comprises a number of parties who are selectively talkers and listeners. In a typical telephony environment, PCM telephone carrier lines according to CEPT or T1 standards are utilized and are connected to a digital conference bridge.

According to the method of the present invention, the PCM companded speech data from each of the parties who is talking is summed together by first converting the PCM companded speech from each talking party from PCM format to linear format. The linear speech data from each talking party is then added together and converted back into a PCM format. Additionally, the companded speech data from each talking party is delayed by an amount precisely necessary to complete the full summation of the speech data together as discussed above. The delayed companded speech data from each individual talker is then subtracted from the summed speech by first converting both the delayed speech and the summed speech from PCM format to linear format, subtracting the delayed speech (now in linear format) from the summed speech (now in linear format) and converting the difference between the two back into PCM format. The summed PCM speech data is then delivered to all other parties on the conference call while the speech data representing the difference is delivered to the individual speaker.

5. Combined Whisper/Nulling Circuit

Figure 10:
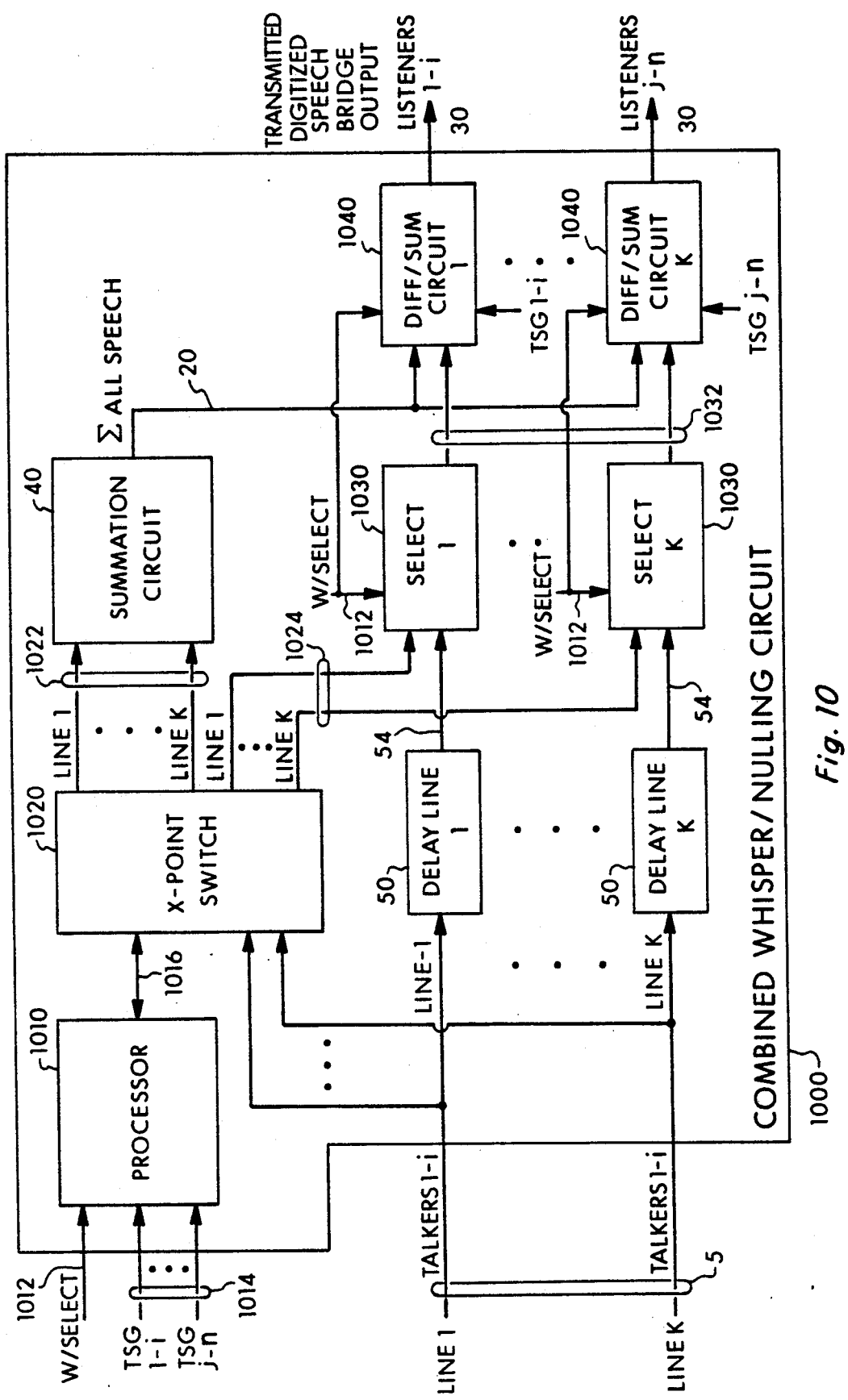
FIG. 10 sets forth the block diagram components of the combined whisper/nulling circuit of the present invention.

In FIG. 10, a combined whisper/nulling circuit 1000 of the present invention is set forth. Use of shared circuitry between the two functions results in a savings in costs of the system. The nulling circuit 10 of FIGS. 1-9 is set forth in FIG. 10 utilizing the same numerical reference numbers where possible.

a. System Configuration

In FIG. 10 is set forth a processor 1010, a cross-point switch 1020, and select circuits 1030. The nulling circuit 60 operates as discussed with respect to FIGS. 1-9. The processor 1010 receives whisper select signals on lead 1012 and the talk slot grant signals on leads 1014 for lines 1-k. The whisper select signals 1012 are generated upon request by the users or the system operator as whisper mode enable signals. The processor 1010 detects the select signal and routes signals via the cross-point switch 1020 appropriately. In whisper select mode, lead 1012 becomes activated for two individual talk slots as will be discussed later. The processor 1010 is interconnected over a bus 1016 to the cross-point switch 1020. In the preferred embodiment, the processor 1010 is a Motorola 68000 or equivalent.

The cross-point switch 1020 is connected over lines 1022 to the summation circuit 40 over lines 1024 to the select circuits 1030 and over lines 5 to the PCM input lines 1 through k. Lines 1022 selectively extend the PCM input lines 1 through k to the summation circuit 40 whereas lines 1024 selectively extend the PCM lines 1 through k to the selection circuits 1030. The cross-point switch 1020 is a full cross-point switch of the type such as Mitel MT8980D.

The select circuits 1030 are interconnected to lines 54 from the delay line circuits 50 and are further connected to the difference/sum circuits 1040 (these circuits are termed "subtraction circuits" in FIGS. 1-9) over lines 1032. A select circuit 1030 is utilized for each line which in the preferred embodiment is four lines (i.e., k=4). In the preferred embodiment, each select circuit 1030 is a cross-point switch such as those manufactured by Mitel MT8980D. The select circuits 1030 switch between speech data from talk slots on lines 1024 (WHISPER MODE by activation of lines 1012) or from talk slots on lines 54 (TALKER NULLING MODE) depending upon the state of lines 1012. The select circuits may be incorporated into the cross-point switch 1020.

In the combined whisper/nulling circuit 1000 of FIG. 10, the subtraction circuit 60 of FIG. 1 is modified to also provide summation. In the TALKER NULLNG MODE of operation, the speech data in a time slot for the talker is delayed by circuits 50, switched from lines 54 to lines 1032 by the select circuits 1030, and delivered through the difference/summation circuits 1040 wherein subtraction occurs. This mode of operation is the same as for FIGS. 1-9 except with the addition of the select circuits 1030 and the use of the whisper select 1012. In the WHISPER MODE of operation, the speech data for the two parties to the whisper conference are interchanged in their respective time slots by cross-point switch 1020 under control of processor 1010 and delivered over lines 1024. The select circuits 1030 for the two whisper conference parties are then activated by whisper select 1012 to deliver the interchanged speech data to the difference/summation circuit 1040 where the interchanged speech data in the talk slot for the first whisper conferee is added to the sum of all speech data 20 for delivery to the second whisper conferee so that the second whisper conferee hears the first whisper conferee talking as well as the conversation from the other talkers in the conference call. However, no other party to the conference call will hear the whisper conference as whisper data is not delivered to the summation circuit 40 via 1022.

Another characteristic of the present invention is that the design of circuit 1040, in the whisper mode of operation (i.e., whisper select=1), attenuates the talkers in the conference call by a predetermined amount such as 6 dB.

b. System Operation

The operation of the combined whisper nulling circuit of the present invention will be explained in the following example.

Figures 11, 12:
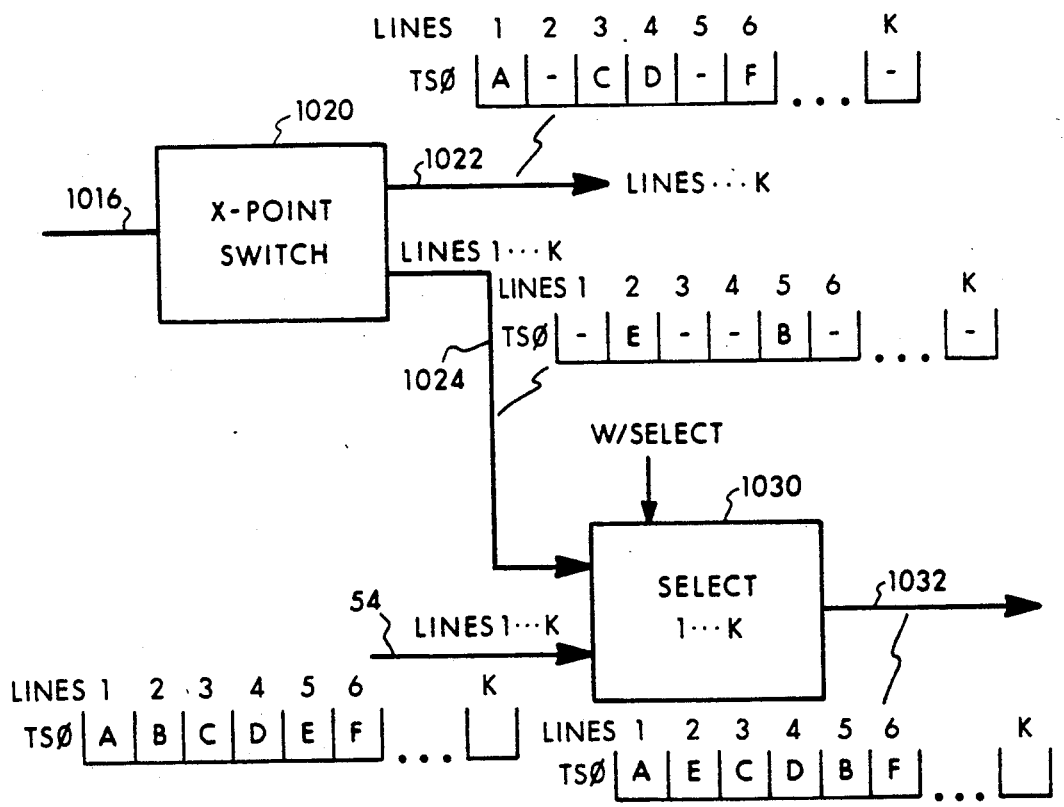
FIG. 11 is a table setting forth an example of a six party conference call with two parties engaged in a whisper conference.
FIG. 12 illustrates the implementation of the example of FIG. 11 in the cross-point switch of the present invention.

FIGS. 11 and 12 set forth an example involving six parties (A, B, C, D, E, and F) involved in a conference call. As set forth in the Table of FIG. 11, activity wise, parties A and F are talking, parties B and E are involved in a whisper conference, and parties C and D are quiet (and are, therefore, listening). The whisper select lines 1012 for the whisper conferees, B and E, are activated (whisper select=1) and their talk slot grant signals (TSG$_B$, TSG$_E$) are don't care to cause the difference/summation circuit 60 to perform summation in the time slot. The conference call talkers (A and F) have their talk slot grant signals (TSG$_A$, TSG$_F$) activated (i.e., TSG=1) to cause the difference/summation circuit 1040 to perform subtraction in the time slot (whisper select =0 for such talkers). Listeners C and D have both the whisper talk slot grants and whisper select set to low.

As shown in FIG. 12, on lines 1 through k in time slot TS0 a digital PCM representation of a portion of each parties speech is allocated. Party A is assigned to line 1 whereas party F is assigned to line 6. These PCM data are delivered on lines 5 into the cross-point switch 1020. Control signals from the processor 1010 are delivered over lines 1016. In this example, the cross-point switch 1020, under control of signals appearing on 1016, connects party B and party E for a whisper conference. Hence, the output on lines 1022 includes all remaining parties to the conference call (A, C, D, and F) but does not include the two whisper conferees. On line 1 of lines 1024, parties B and E have their speech data interchanged so that the PCM speech data for party E occurs on line 2 and the PCM speech data for party B occurs on line 5.

With reference back to FIG. 10, the select switches 1030 are appropriately activated to deliver the whisper conferee speech data to circuit 1040 so as to "add" in circuit 1040 the PCM speech data for whisper talker E to the speech data for the A and F talkers in the main conference call. Therefore, as shown in FIG. 11, party B to the whisper conference hears E speaking as well as parties A and F. Likewise, party E to the whisper conference receives the PCM speech data from whisper conferee B as well as talkers A and F from the main conference call. Hence, under the arrangement of the present invention, the cross-point switch 1020 over lines 1024 selectively interchanges the PCM speech data for the two whisper party conferees and removes their speech data from the lines 1022 bearing the main conference call conversation. This interchanged PCM data is then delivered through the suitable select circuit 1030 which is activated to deliver the interchanged whisper conferee PCM data onto lines 1032.

As witnessed in FIG. 12, the input PCM speech data is also being delivered over line 54 into the select circuit 1030 from the delay lines 50. The select circuit 1030 under the whisper select W/SELECT properly inserts the interchanged PCM speech data for E and B into the output on lines 1032. The difference/sum circuits 60 are selectively activated based upon the W/SELECT and TSG signals to either add or subtract or ignore the PCM speech data on lines 1032 in time slot TS0 as illustrated in FIG. 11.

In the above example, for party A who is talking in the main conference, the talk slot grant for A conditions the difference/summation circuit 1040 to subtract the speech data for A from the summation of A, F appearing on lines 20. Hence, the conversation heard by party A is only that of party F. For party B, the other whisper conferee E's PCM speech data is added to the main two talkers speech data on the conference call. However, the main two talkers speech is attenuated (as indicated by the parenthesis (A and F)). Hence, whisper conferee party B hears the conversation from E and in the background the conversation of A and F. Parties C and D to the conversation only hear the PCM speech data from speakers A and F as the 1032 input is ignored. However, whisper conferee E hears the conversation from A, F and B. Finally, party F to the main conference hears party A's speech.

In Table III sets forth a representative example of hexadecimal speech values for FIG. 11:

TABLE III

COMBINED WHISPER/TALKER NULLING
(Data Values are in Hexadecimal)

| Talker | U-Law PCM Input Speech Data 5 | U-Law Summation Output 20 | Null Sub. | Whisper Add | Conversation Heard 30 |
|---|---|---|---|---|---|
| A | 66 | 68 | 66 | — | 35 |
| B | AA | 68 | — | D6 | (68)* + D6 |
| C | 35 | 68 | — | — | 68 |
| D | AA | 68 | — | — | 68 |
| E | D6 | 68 | — | AA | (68)* + AA |
| F | 35 | 68 | 35 | — | 66 |

*attenuated by 6 dB

It is to be understood that while the talker nulling circuitry must precisely match the subtraction of the talker's speech data from the summation of all speech data, such precise timing is not necessary for the whisper conferees.

6. Whisper Circuit

Figure 13:
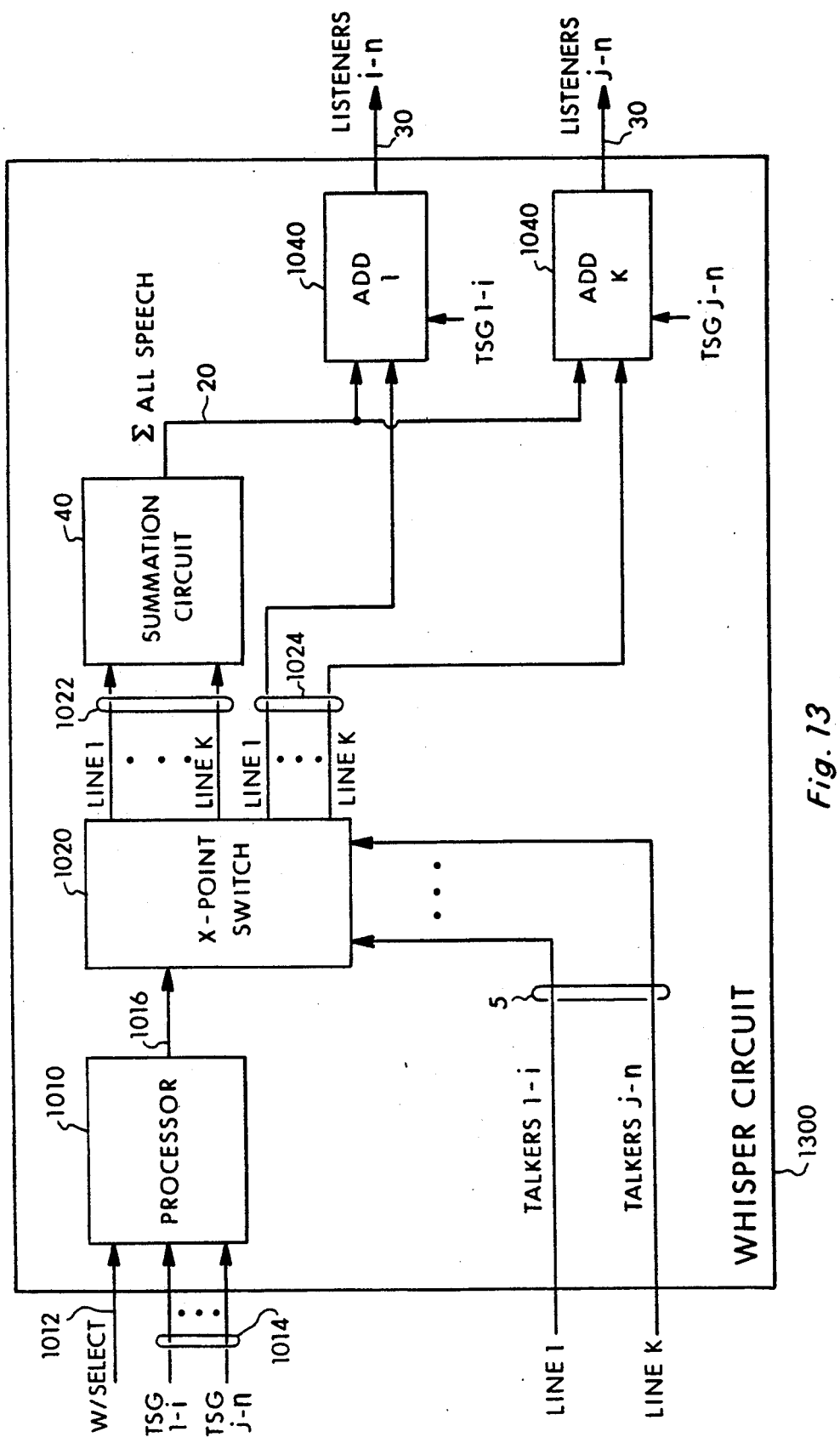
FIG. 13 sets forth the block diagram details of the whisper circuit of the present invention.

In FIG. 13 is set forth the details of a stand alone whisper circuit 1300. As before, the same referenced numerals correspond to the identical circuitry being used in FIGS. 1 and 10. In FIG. 13 and when compared to FIG. 10, the nulling circuitry comprising the delay lines 50 are eliminated as well as the switching circuitry select 1-k 1030. In all other aspects, the whisper circuit operates according to the above discussion for FIGS. 10–12.

For example, in FIG. 14, which corresponds to the example of FIG. 11 except the talking nulling feature is eliminated, the conversation heard is set forth. Parties A, C, D, and F would all hear talkers A and F speaking but not the whisper conferees B and E. The whisper conferees B and E would hear all of the conversation in the main conference call plus the other whisper conferees speech.

It is to be expressly understood that the claimed invention is not to be limited to the description of the preferred embodiment but encompasses other modifications and alterations within the scope and spirit of the inventive concept.

I claim:

1. A circuit (1300) for providing whisper conferencing between two whisper conferees in a conference call, said conference call having a plurality of parties (n) including said whisper conferees who are talkers and listeners on PCM telephone carrier lines (k) connected to a digitized conference bridge, said circuit comprising:

means (1010, 1020) connected to said PCM telephone carrier lines for interchanging the PCM speech data occurring in the time slots for said two whisper conferees so that said PCM speech data for the first of said two whisper conferees is placed on the line for the second of said two whisper conferees and said PCM speech data for said second of said two whisper conferees is placed on the line for said first of said two whisper conferees, means (40) connected to said interchanging means for digitally outputting the sum of all speech data from the remaining PCM telephone carrier lines not involved with said whisper conference, means (60) receptive of said interchanged speech data from said interchanging means and receptive of said sum of all speech data from said outputting means for adding (1) said interchanged PCM speech data of said second whisper conferee appearing on the line of said first whisper conferee to said sum of all speech signal in the aforesaid line of said first whisper conferee and (2) said interchanged PCM speech data of said first whisper conferee appearing on the line of said second whisper conferee to the sum of all speech signal on the aforesaid line of said second whisper conferee.

2. The whisper conferencing circuit of claim 1 wherein said digitally outputting means (40) comprises:

means (400) receptive of PCM speech data on said PCM telephone carrier lines not involved with said whisper conference for converting said PCM speech data from PCM format to linear format, means (410) connected to said converting means for adding said PCM speech data in linear format found in each PCM time slot together, means (420) connected to said adding means for converting said added linear speech data in each said PCM time slot from linear format to said sum of all speech in PCM format.

3. The whisper conferencing circuit of claim 2 wherein said PCM format is in $\mu$-law companded format for T1 transmission.

4. The whisper conferencing circuit of claim 1 wherein said interchanging means comprises:

a processor (1010), and a cross-point switch (1020) controlled by said processor.

5. The whisper conferencing circuit of claim 1 wherein said adding means attenuates said sum of all speech by a predetermined amount.

6. A circuit (1000) for providing whisper conferencing between two whisper conferees in a conference call having talker nulling, said conference call having a plurality of parties (n) who are talkers and listeners on PCM telephone carrier lines (k) connected to a digitized conference bridge, said circuit comprising:

means (1010, 1020) connected to said PCM telephone carrier lines for interchanging the PCM speech data occurring in the time slots for said two whisper conferees so that said PCM speech data for the first of said two whisper conferees is placed in the line for the second of said two whisper conferees and said PCM speech data for said second of said two whisper conferees is placed in the line for said first of said two whisper conferees, means (40) connected to said PCM telephone carrier lines for digitally outputting the sum of all speech (20) on said PCM telephone carrier lines not involved with said whisper conference, means (50) connected to said PCM telephone carrier lines for delaying the speech of each individual talker who is not a whisper conferee, means (1030) connected to said delaying means and to said interchanging means for selecting either to output said interchanged data from said interchanging means corresponding to said whisper conference or to output said delayed speech from said delaying means corresponding to said talker nulling, means (1040) receptive of said interchanged speech data from said selecting means, said delayed speech from said selecting means and receptive of said sum of all speech data from said digitally outputting means for adding (1) said interchanged PCM speech data of said second whisper conferee appearing in the line of said first whisper conferee to said sum of all speech signal in the aforesaid line of said first whisper conferee and (2) said interchanged PCM speech data of said first whisper conferee appearing in the line of said second whisper conferee to the sum of all speech signal in the aforesaid line of said second whisper conferee for said whisper conference, said adding means further subtracting the digital value of said delayed speech of each individual talker from said sum of all speech, said subtracting means delivering (303) said sum of all speech less said individual talker's speech as said individual talker listens, said delaying means delaying said speech of each said individual talker to match the timing of each said talker's speech in said sum of all speech.

7. The circuit of claim 6 wherein said digitally outputting means (40) comprises:

means (400) receptive of PCM speech data on said PCM telephone carrier lines for converting said PCM speech data from PCM format to linear format, means (410) connected to said converting means for summing said speech data in linear format found in each PCM time slot together, means (420) connected to said adding means for converting said added linear speech data in each said PCM time slot from linear format to said sum of all speech in PCM format.

8. The circuit of claim 7 wherein said PCM format is in $\mu$-law companded format for T1 transmission.

9. The circuit of claim 7 wherein said PCM format is in A-law companded format for CEPT transmission.

10. The circuit of claim 7 wherein said PCM to linear converting means is a look-up table.

11. The circuit of claim 7 wherein said summing means is a sixteen bit adder.

12. The circuit of claim 7 wherein said linear to PCM converting means is a look-up table.

13. The whisper conferencing circuit of claim 6 wherein said adding means attenuates said sum of all speech by a predetermined amount.

14. A circuit (1000) for providing whisper conferencing between two whisper conferees in a conference call having talker nulling, said conference call having a plurality of parties (n) who are talkers and listeners on PCM telephone carrier lines (k) connected to a digitized conference bridge, said circuit comprising:

means (1010, 1020) connected to said PCM telephone carrier lines for interchanging the PCM speech data occurring in the time slots for said two whisper conferees so that said PCM speech data for the first of said two whisper conferees is placed in the line for the second of said two whisper conferees and said PCM speech data for said second of said two whisper conferees is placed in the line for said first of said two whisper conferees, means (40) connected to said PCM telephone carrier lines for digitally outputting the sum of all speech

(20) on said PCM telephone carrier lines not involved with said whisper conference, means (1030) connected to said interchanging means for selecting either to output said interchanged data from said interchanging means corresponding to said whisper conference or to output the speech of each individual talker who is not a whisper conferee, means (1040) connected to said selecting means and to said digitally outputting means for adding (1) said interchanged PCM speech data of said second whisper conferee appearing in the line of said first whisper conferee to said sum of all speech signal in the aforesaid line of said first whisper conferee and (2) said interchanged PCM speech data of said first whisper conferee appearing in the line of said second whisper conferee to the sum of all speech signal in the aforesaid line of said second whisper conferee for said whisper conference, said adding means further subtracting the digital value of said speech of each individual talker from said sum of all speech, said adding means delivering (303) said sum of all speech less said individual talker's speech as said individual talker listens.

* * * * *